Aug. 4, 1964
R. E. MORRIS
3,143,457
VIBRATION DAMPING TREATMENTS
Filed March 9, 1960
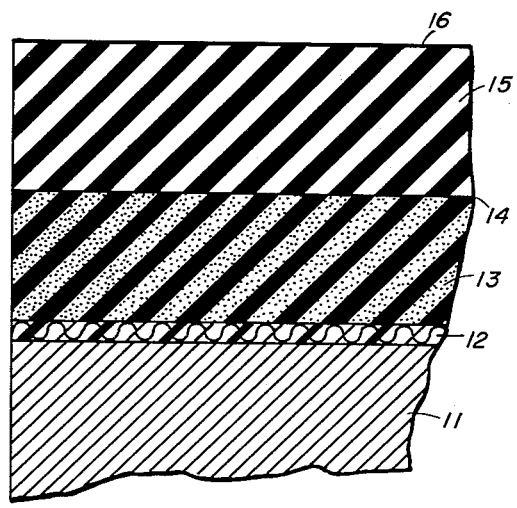
INVENTOR.
ROSS E. MORRIS
BY
ATTORNEYS

United States Patent Office 3,143,457
Patented Aug. 4, 1964

3,143,457
VIBRATION DAMPING TREATMENTS
Ross E. Morris, Vallejo, Calif., assignor to the United States of America as represented by the Secretary of the Navy
Filed Mar. 9, 1960, Ser. No. 13,970
7 Claims. (Cl. 161—161)
(Granted under Title 35, U.S. Code (1952), sec. 266)

The invention described herein may be manufactured and used by or for the Government of the United States of America for governmental purposes without the payment of any royalties thereon or therefor.

The present invention relates to the damping of structural vibrations; particularly the vibrations of submarine hulls and other structure.

For reasons that will become apparent, the invention to be described is particularly adapted for submarine work, although, as also will be appreciated, it is suitable for a variety of uses.

Because of the need for submarines to avoid detection, the United States Navy and others have devoted much effort toward the elimination of sound wave emanations and, as is more presently pertinent, to the suppression or damping of sound wave generation due to hull or machinery vibrations. The problem has been a difficult one not so much because of any absolute inability to dampen vibrations but because any submarine damping media or treatment should be light, relatively thin, pliable, easily-installed and of acceptable cost.

As would be expected, there have been many entirely feasible proposals which have been carefully tested and evaluated with the result that a particular treatment has become somewhat standardized. This so-called "standard" utilizes a laminate structure having an inner layer of chromated felt and an outer layer (preferably) of galvanized sheet steel, and, as already indicated, it has proven itself the most effective of a wide variety of treatments including such materials as paper gasketing, canvas laminates, rubbers, blotting paper, asbestos paper, etc.

More particularly, this standard treatment has demonstrated a damping rate of 57 db/sec. at a low frequency of 240 c.p.s. and a rate of 340 db/sec. at a higher frequency of 540 c.p.s. These figures were obtained from a testing procedure known as a modified Geiger plate procedure and the frequencies used reflect the manner of testing. According to this procedure, steel plates, each 2 feet x 3 feet x 1½ inches, are supported horizontally at four symmetrically spaced points and caused to vibrate at one of its two natural frequencies by means of an electromagnetic vibration exciter. The natural frequencies are approximately 240 and 540 cycles per second. When a certain amplitude of motion is obtained, $1.7 \times 10^{-5}$ inch at 240 c.p.s. or $7.5 \times 10^{-6}$ inch at 540 c.p.s. as determined with an accelerometer, the current to the vibration exciter is stopped. The decaying signal from the accelerometer then is amplified, filtered and recorded. By measuring the amplitude of the signal at the beginning and at the end of an interval, the damping of the plate is calculated in terms of decibels per second using the following equation:

$$\text{decibels attenuation per second} = \frac{20}{\Delta t} \log \frac{A_1}{A_2}$$

where:
$A_1$ is the signal amplitude at the start of the interval
$A_2$ is the signal amplitude at the end of the interval
$\Delta t$ is the interval in seconds This method of determining damping rate is an accepted procedure which is of present interest because the treatments of the present invention were tested in a similar manner.

Although the standard treatment represented an optimum and has been rather widely used, it is relatively objectionable in several regards. For one thing, its attenuation by no means insures against submarine detection and it is obvious that any increased damping would be most desirable if not mandatory. Also, in assembling and applying it, it is necessary to utilize special attaching devices, such as stop nuts and washers, and these devices materially complicate the installation and increase its expense. Further, the materials themselves are relatively expensive, and the treatment as finally affixed is rather heavy, thick and not especially adapted for varying contours and surfaces.

It is therefore the general object of the present invention to provide an improved vibration damping treatment.

More specifically, one of the objects is to provide a damping treatment for submarine structural members which has a substantially increased damping rate over that found in the present chromated felt/sheet metal standard treatment already described.

A further object is to provide a low-cost treatment capable of readily being applied to varying surface contours.

A related object is to provide a treatment that excels in damping efficiency when applied to structure having natural resonant frequencies of 240 c.p.s. and 540 c.ps.

Still another object is to provide a damping treatment that excels in vibration attenuation when applied to structural members having a thickness of greater than ¼ of an inch.

Other important objects will become apparent.

Generally considered, the damping treatment of the present invention is formed essentially of a double-layered construction, the outer layer being a heavy solid material such as butyl rubber or, as will be explained, its physical equivalent; the other so-called under layer being a compliant, spongeous material which, in the preferred form is a butyl sponge rubber but which, as will be appreciated, can be of any material having substantially equivalent physical properties. Most suitably, the outer and inner layers, which either may be bonded or molded together to form a unit, are adhesively secured to the structural member to be dampened and to facilitate the forming and applying of the treatment, suitable fabrics, such as a light duck material, may be applied to either or both sides of the inner or outer layer. If the two layers are to be adhesively secured together, a suitable cement, such as Vulcalock (B. F. Goodrich Company) or Pliobond 20 (Goodyear Tire and Rubber Company) can be employed. Other materials to be described can be substituted in place of these cements and, as will be appreciated, the selection of the adhesive will be dependent somewhat upon the installation including the strength requirements as well as the deteriorating agents to which the material might be subjected.

In theory the damping characteristic of the present treatment results from the energy absorption in the under layer when it is flexed as a result of relative motion between the over layer and the structural member to which the treatment is adhered. In other words, it is conjectured that this relative motion must accomplish a certain amount of work in overcoming the viscous or imaginary modulus of the compliant spongeous material and the damping efficiency should be directly proportional to this amount of work which, of course, is converted to heat rather than being generated in a vibrational mode.

However, another significant consideration of the present invention has been the finding that the damping efficiency is not dependent solely on the weight per unit area of the heavy layer. Thus, much of the prevalent thinking has been predicated on an assumption that the vibrational energy is converted to heat by the flexing of the sponge in a directon normal to that of the underlying steel structural member. If such a theory were correct, the weight per unit area would be entirely controlling and the thickness, stiffness and other properties of the heavy layer would have a negligible effect on damping efficiency. Present experimentation, however, verifies that there must be modes of vibration other than those normal to the structural member and that these other modes contribute significantly to the energy absorption by the treatment. Such being the case, one of the findings of the present invention is that, in addition to weight per unit area, other physical properties of the materials used must be carefully taken into consideration. In other words, success of the treatment is dependant on such factors as dynamic modulus, loss factor or hysteresis, as well as weight per unit area. These factors are important both with regard to the heavy overlayer and the underlayer, although, in the underlayer, it is the cellular structure of the spongeous material rather than the weight per unit area that is significant.

The single illustration shows a cross section of the preferred form of damping treatment.

In detail the numeral 11 represents a steel submarine plate to be treated. The preferred treatment as illustrated comprises, an outerlayer 15 of heavy butyl rubber and an underlayer 13 of butyl sponge rubber, cured together and applied as a unit to the steel plate.

The composition of the two stocks, namely the sponge 13 and the heavy layer 15 are given below:

Butyl Sponge Rubber Underlayer 13

| | |
|---|---|
| Butyl 215 | 100 |
| Thermax | 60 |
| Protox 166 | 5 |
| Circo light process oil | 50 |
| Paraffin | 5 |
| Stearic acid | 3 |
| Unicel S | 4 |
| Methyl Tuads | 3 |
| Captax | 3 |
| Sulfur | 3 |

Heavy Butyl Rubber Outerlayer 15

| | |
|---|---|
| Butyl 325 | 100 |
| Litharge | 1100 |
| Lead dioxide | 10 |
| Protox 166 | 5 |
| Stearic acid | 6 |
| Dibenzo GMF | 6 |

Specific gravity: 5.15.

In further identification of the materials used in the two preceding examples: Butyl 215 is a conventional synthetic rubber, such as is recognized in many publications as GR–I (Government Rubber isobutylene), the numerals 215 designating the fact that it has a mole percent chemical unsaturation between 1.5 and 2.0 percent. Butyl 325 used in the heavy or solid rubber formulation differs in that its numerals designate a mole percent unsaturation between 2.0 and 2.5 percent. The principal physical difference between the two rubbers is one of resiliency, although the degree of unsaturation also affects vulcanization and other processing steps in manners known to the art.

Thermax is an R. T. Vanderbilt Company, Inc., trademark for a thermatomic carbon widely used in synthetic rubber compounding. Protox 166 is a brand name used by the New Jersey Zinc Company for a propionic-acid-treated zinc oxide having incorporation and dispersion characteristics particularly useful to rubber compounders. Unicel S is Dupont's trademark for a rubber chemical comprising a 50% dispersion of finely divided sodium bicarbonate in oil; the use of this chemical being that of a blowing agent. Methyl Tuads, particularly the term Tuads, is R. T. Vanderbilt Company, Inc. trademark for a rubber accelerator and vulcanizing agent, namely tetraethylthiuram disulfide and tetramethylthiuram disulfide. Captax is Vanderbilt Company tradename for mercaptobenzothiazole used as an accelerator. Dibenzo GMF is Naugatuck Chemical Division of U.S. Rubber Company's tradename for dibenzoyl-para-quinonedioxime, a vulcanizing agent.

In preparing the treatment the heavy butyl rubber 15 is compounded and then, preferably, cured for 25 minutes at 310 degrees Fahrenheit in a mold of the desired size. As far as the effectiveness of the final product is concerned, the cure can be omitted although it, of course, is desirable to enable better resistance to solvents, to permit shape-retention and to provide a non-tacky surface.

As to underlayer 13 sponge stock, after compounding, it is calendered at the desired gauge at even speed and light pressure against a duck material 12. The duck may be a 10 ounce cotton duck or a lighter 5 ounce duck which has been found to have no sacrificial effect on damping.

Lower side 14 of the cured heavy butyl sheet 15 then is roughened with coarse emery cloth and two coats of a 30 percent cement comprising the sponge stock compound mixed in a Standard Thinner No. 200 applied to the buffed or roughened surface. The calendered sponge and cotton duck combination then is rolled, rubber side down, onto the cemented, roughened side of said cured heavy butyl sheet. Other adhesives may be used although preferably any adhesive employed should have a small degree of flexibility. By way of example the Vulcalock or Pliobond 20 (previously identified) are suitable; as are various rubbers, rubbers and resin, or slightly flexible resin. Its application can be in the form of a film or an organic solvent solution. The assembly of the cured heavy butyl sheet and sponge rubber compound then is placed in a mold of the thickness required to obtain a 200 percent blow in the cured sponge layer. It will be recognized that one method of assembly is being described and that the art will recognize many permissible variations. Thus, rather than mold the two layers as a unit each can be molded separately and subsequently joined by an adhesive. The percent blow also is a variable which can be emperically determined in accordance with each application, although as far as the specific material already described is concerned, the 200 percent blow is a significant factor. The cellular structure of the underlayer is immaterial to the extent that its cells may be connected or disconnected.

The epoxy resin used in the treatments was Epon 828, activated for cure with Epon Curing Agent "U." Both materials are manufactured by the Shell Chemical Corporation. The activated mixture had the following composition:

| | |
|---|---|
| Epon | 100 |
| Epon Curing Agent U | 25 |

The above related preferred treatment provided an overlayer 15 of a solid heavy butyl rubber having a finished thickness of ¼ inch. The underlayer 13 of butyl sponge and the 10 ounce duck has a finished thickness of 7/32 inch. It further has been found beneficial in some applications to use an overcoat 16 of epoxy resin and this resin preferably is of a semi-flexible type. Such an overcoat protects the laminate treatment from attack by prevalent fluids to which one or the other of the rubbers may not be resistant. Also, this overcoat should be extended over the edges and a fabric tape of adequate width employed over the edging to provide a seal. In testing by using the modified Geiger plate method described earlier, this preferred treatment demonstrated a damping rate of 280 db/sec. at the lower resonant test frequency of 240 c.p.s. At the higher test frequency of 540 c.p.s. the damping obtained was 490 db/sec. when applied. As will be recalled, this testing was conducted on a 1½ inch steel plate. The same treatment also was tested on plates of other thicknesses and it was found equal or superior to the standard treatment at all thicknesses over ¼″. Also, the tests proved to be reproduceable although, as with the standard treatment, they were somewhat temperature sensitive.

In addition to the improved damping effectiveness, estimated manufacturing and installation costs of the present treatment is approximately half that of the standard treatment. In further comparison with varying thicknesses of overlayers and underlayers, it was evident that decreasing the layer thickness had little effect on damping efficiency at higher frequency, but decreased it at the lower frequency. To summarize, the preferred treatment as described above, appears to be best from the standpoint of both damping efficiency and cost of manufacturing and installation.

The experimentation which established the above-described treatment as a distinct improvement also was extended to many compounds and combinations of materials to determine their efficacy.

For example, natural rubber was substituted for the butyl rubber and, probably because of the marked departure in the physical properties of hysteresis and dynamic modulus, the damping rates were reversed in that the higher damping rate was found at the lower natural frequency and vice versa. Also, the damping rates did not compare favorably with the so-called standard treatment.

On the other hand a heavy layer stock compounded from Synpol 8000 (a high styrene-butadiene copolymer of Texas-U.S. Chemical Company) was substituted for the butyl with good results. The stock for this test was compounded as follows:

| | |
|---|---|
| Synpol 8000 | 100 |
| Litharge | 1100 |
| Protox 166 | 5 |
| Stearic acid | 1 |
| Neozone D | 1 |
| Di Cup 40C | 8 |

Cure: 20 minutes at 310° F.
Specific gravity: 5:38.

This Synpol stock was tried because its high sytrene content (43%) would provide physical properties in between natural rubber and butyl rubber vulcanizates. In results, a treatment formed identically to that previously described was found to have a damping rate of 100 db/sec. at 240 c.p.s. and 600 db/sec. at 540 c.p.s. As will be noted, this rate is superior to that of the standard treatment, although it is not as versatile at both frequencies as the butyl treatment already described. Also, the Synpol stock is somewhat impractical for milling because of its excessive sticking to the mill rolls.

In identification of previously-unidentified materials used in the Synpol stock, Neozone D is Dupont's tradename for a rubber antioxidant, phenyl-beta-napthylamine.

The data obtained from the testing of the previously-described natural rubber overlayer were surprising in that the damping rate for the righ and low frequencies was reversed from that demonstrated by the butyl treatment. It was believed that the thickness, stiffness and other properties would have negligible effect and that the results would be somewhat proportional to the weight per unit area. However, it is apparent that, in addition to the weight per unit area, the modes of vibration of the particular overlayer are most significant. The marked difference between natural and butyl rubber in hysteresis and dynamic modulus are considered responsible for the differences in attenuation observed; these properties being most significant in determining modes of vibration or, in other words, the differences between the frequencies, amplitudes and phases of the heavy overlayer and the steel plate on which it is placed.

From other testing, it appears that such aspects on the percent blow of the sponge layer can be increased at least from the 200 percent mentioned to 250 percent. Other conditions being the same, such an increased blow increased the average attenuation at 240 c.p.s. about 40 percent; while at 540 c.p.s. the attenuation was not significantly changed.

It also is possible to vary the thicknesses of the layers and still obtain an improved treatment. A treatment similar to the butyl overlayer and butyl sponge underlayer was tested using a thickness of overlayer of ⅛ inch as compared to the described ¼ inch. At 240 c.p.s. the attenuation was 100 db/sec. and at 540 c.p.s. it was 660 db/sec. Since the attenuation at the lower frequency is materially decreased, it is apparent that there is a limit to the thinness of the overlayer. Conceivably, the thinness could be compensated by increased weight obtained by incorporating lead shot or other metals, plastics, etc. However, as far as present experimentation is concerned, the limitation of overlayer thinness for butyl compounds or their physical equivalent is about ⅛ inch. The underlayer also may be thinner than the described 7/16 inch, although any proportional reduction does sacrifice some attenuation at the lower frequency. It improves attenuation at the higher frequency. Increasing the thickness of the underlayer has the reverse effect.

Thickness generally would be determinable from the nature and thickness of the outer layer as well as the frequencies of the vibrations of the structure to be dampened. In any event, within the principles described, substantial variations can be achieved in materials and thicknesses and the resulting treatment, nevertheless, demonstrates a significant attenuation improvement over the standard treatment. Further, the ability to adhere the treatment to vertical or overhead surfaces without special attachments, as well as the low cost and weight, render the present treatment desirable apart from its attenuation characteristics.

Obviously many modifications and variations of the present invention are possible in the light of the above teachings. It is therefore to be understood that within the scope of the appended claims the invention may be practiced otherwise than as specifically described.

What is claimed is:

1. A laminated water-borne ship structural section for dampening sound waves generated by ship-produced mechanical vibrations, said section comprising a metal sheet of at least ¼ inch thickness, a cellular vulcanized butyl rubber layer coextensive with and continuously bonded to said metal section, and a solid high-density butyl rubber overlayer coextensive with and continuously bonded to said cellular layer, the mass per unit area of the dense overlayer and the relative thicknesses, dynamic moduli and loss factors of the two rubber layers being mutually fixed for providing a vibrational damping rate of at least 57 db/sec. at 240 c.p.s. and at least 340 db/sec. at 540 c.p.s.

2. The structural section of claim 1 wherein said cellular layer is a vulcanized butyl rubber composition having approximately a 200 percent blow, and said solid overlayer is a butyl rubber composition having a specific gravity of about 5.

3. The structural section of claim 1 wherein said two butyl rubber layers are molded together as a unitary structure.

4. The structural section of claim 1 wherein said overlayer is litharge-loaded.

5. The structural section of claim 1 wherein said high-density overlayer is formed of the following stock:

| | Parts by weight |
|---|---|
| Butyl rubber (Butyl 325) | 100 |
| Litharge | 1100 |
| Lead dioxide | 10 |
| Propionic-acid-treated zinc oxide (Protox 166) | 5 |
| Stearic acid | 6 |
| Vulcanizing agent (Dibenzo GMF) | 6 | and said cellular layer is formed of the following stock:

| | |
|---|---|
| Butyl rubber (Butyl 215) | 100 |
| Thermatomic carbon (Thermax) | 60 |
| Propionic-acid-treated zinc oxide (Protox 166) | 5 |

| | |
|---|---|
| Light process oil | 50 |
| Paraffin | 5 |
| Stearic acid | 3 |
| Blowing agent (Unicel S) | 4 |
| Vulcanizing agent (Methyl Tuads) | 3 |
| Accelerator (Captax) | 3 |
| Sulfur | 3 |

6. The structural section of claim 5 wherein said overlayer is formed with a specific gravity of about 5.

7. The structural section of claim 6 wherein said metal sheet is a steel plate of at least ¼ inch thickness, said overlayer is about ¼ inch thick, and said cellular layer is about 7/16 inch thick.

References Cited in the file of this patent

UNITED STATES PATENTS

| | | |
|---|---|---|
| 2,246,101 | McEnany | June 17, 1941 |
| 2,278,733 | Peik | Apr. 17, 1942 |
| 2,319,675 | Grinter | May 18, 1943 |
| 2,389,210 | Pitman | Nov. 20, 1945 |
| 2,875,435 | McMillan | Feb. 24, 1959 |